United States Patent [19]

Bilow et al.

[11] Patent Number: 4,534,882
[45] Date of Patent: Aug. 13, 1985

[54] METHOD OF MAKING AN EPOXY PREPOLYMER CURING AGENT

[75] Inventors: Norman Bilow, Encino; Ralph D. Hermansen, Northridge, both of Calif.

[73] Assignee: Hughes Aircraft Company, El Segundo, Calif.

[21] Appl. No.: 646,885

[22] Filed: Sep. 4, 1984

[51] Int. Cl.³ .............................................. C08G 59/50
[52] U.S. Cl. ..................................... 252/182; 528/94; 528/98; 528/99; 528/111; 528/407
[58] Field of Search ..................... 528/94, 98, 99, 111; 252/182

[56] References Cited

U.S. PATENT DOCUMENTS

| | | | |
|---|---|---|---|
| 3,533,985 | 10/1970 | Lantz et al. | 528/99 X |
| 3,536,654 | 10/1970 | Lantz et al. | 528/99 X |
| 3,989,673 | 11/1976 | Jenkins et al. | 528/117 |
| 3,993,707 | 11/1976 | Cummings | 528/99 |
| 4,286,656 | 5/1981 | Ray-Chaudhuri et al. | 528/99 X |
| 4,360,649 | 11/1982 | Kamio et al. | 528/99 X |

*Primary Examiner*—Earl Nielsen
*Attorney, Agent, or Firm*—A. W. Karambelas

[57] ABSTRACT

A method of making an epoxy prepolymer curing agent is disclosed. The method comprises the steps of reacting a mixture of piperidine and an epoxy resin so as to form an epoxy prepolymer adduct. The adduct is mixed with 2-ethyl-4-methylimidazole thereby forming the curing agent composition.

11 Claims, No Drawings

METHOD OF MAKING AN EPOXY PREPOLYMER CURING AGENT

BACKGROUND OF THE INVENTION

1. Field of the Invention

This invention relates to the methodology for making an epoxy prepolymer curing agent composition.

2. Description of the Background Art

The advantages of using a mixture of piperidine and 2-ethyl-4-methylimidazole as a curing agent for epoxy resins is disclosed in U.S. Pat. No. 3,989,673, assigned to the assignee of the present invention. While such curing agent does provide a number of advantages, it has been found that during its use, noxious piperidine vapors may escape, thereby exposing formulators and users to a potential hazard. It is believed that the piperidine vapors are created due to the high vapor pressure of piperidine which boils at 106° C.

Thus, notwithstanding the advantages associated with a curing agent comprised of piperidine and 2-ethyl-4-methylimidazole, the shortcoming mentioned above has existed for some time for which a solution has proved elusive.

The present methodology and related prepolymer enables the epoxy resins disclosed in U.S. Pat. No. 3,989,673 to be cured, but in manner so as to substantially obviate the noxious vapor problem mentioned above. Thus, by the methodology of the present invention, toxicity hazards normally encountered when using piperidine in the curing of epoxy resins is to a large extent obviated.

SUMMARY OF THE INVENTION

The present invention is directed to a method of making an epoxy curing agent prepolymer. The methodology comprises the steps of reacting a mixture of piperidine and a polymerizable glycidyl ether epoxy at a relatively low temperture. An epoxy prepolymer adduct is formed which is further mixed with an alkyl substituted imidazole thereby forming the epoxy prepolymer curing agent. This epoxy prepolymer curing agent can then subsequently be used to cure a wide range of epoxy resins such as those disclosed in U.S. Pat. No. 3,989,673.

It is therefore one object of the present invention to provide a low vapor pressure amine curing agent for epoxy resins.

Another object of the present invention is to provide a prepolymer which incorporates piperidine in a nonvolatile state.

Yet another object of the present invention is to provide a prepolymer containing both piperidine and ethylmethylimidazole in a form which is relatively safe for use in conventional processing facilities.

A further object of the present invention is to provide a prepolymeric amine curing agent which cures epoxy resins without producing significant exothermic heat.

These and other objects are achieved by the methodology and related prepolymer curing agent of the present invention.

The novel features which are believed to be characteristic of this invention, both as to its organization and method of operation, together with yet further objectives and advantages thereof will be better understood from the following description considered in connection with the accompanying examples in which a presently preferred embodiment of the invention is illustrated. It is to be expressly understood, however, that the examples are for the purpose of illustration and description only, and are not intended as a definition of the limits of the invention.

DETAILED DESCRIPTION OF THE INVENTION

As discussed in U.S. Pat. No. 3,989,673, epoxy resins have a number of desirable properties especially in a resin system in which various fillers are incorporated. However, conventional epoxy-hardener systems of the prior art are generally not adequate because of their propensity for exhibiting high exotherms during mixing or necessitating elevated temperatures to achieve good cures. The advantages set forth in U.S. Pat. No. 3,989,673 relate to the use of an epoxy curing agent mixture comprised of piperidine and 2-ethyl-4-methylimidazole. The particular resins which were used include Epon 828 [commercial name for a diglycidyl ether of Bisphenol A having an epoxide equivalent weight of 180-195, with Bisphenol A being 2,2-bis(4-hydroxyphenyl)propane]. As set forth in U.S. Pat. No. 3,989,673, a number of advantages are achieved by such a curing agent, especially when used in a weight ratio of piperidine to 2-ethyl-4-methylimidazole of 4:6.

As set forth above, while effective, such curing agent has potential problems in that the use of the low boiling point amine (piperidine) can create toxic vapors which are released in the curing process. Such vapor may be hazardous both to the users and to the environment. As a result, the use of that curing agent may necessitate the use of other expensive equipment to isolate and/or remove the resulting vapors.

In studying this problem, it was determined that piperidine was the cause of the noxious vapors as it has a high vapor pressure and boils at only 106° C. By comparison, 2-ethyl-4-methylimidazole boils at 295° C. and Epon 828 is essentially nonvolatile. However, because of the advantages of a 4:6 PIM (Piperidine to Imidazole) curing agent, the individual components were studied in terms of prereacting such components so as to limit the ability of the piperidine to subsequently cause vapor problems. More specifically, piperidine and Epon 828 were first reacted together while keeping the temperature below 30° C., thus substantially limiting the ability of the piperidine to vaporize due to the heat of reaction. This procedure yields a prepolymer adduct having the following formula:

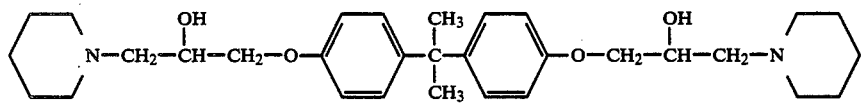

The adduct is then mixed with 2-ethyl-4-methylimidazole (EMI) so as to form the desired prepolymer curing agent mixture. The proportions of epoxy to piperidine are selected such that substantially all the piperidine reacts with the epoxy. Substantially all of the imidazole remains unreacted, although some minimal reaction between the resin and the imidazole may take place. The proportions of all the ingredients are further selected so as to produce a viscous, but readily useable solution. The prepolymer curing agent can subsequently be used to cure epoxy resins essentially as disclosed in U.S. Pat. No. 3,989,673.

One of the advantages of the curing agent of the present invention is that the cured epoxy resins have the same formula as when cured with the 4:6 PIM curing agent of the prior art. Thus, the use of the prepolymer curing agent of the present invention represents a change in the method of curing the epoxy resins, rather than in the formation of cured epoxies which have different chemical structures.

Other examples showing the use of various proportions of the piperidine and imidazole are set forth in Table I hereinbelow. Table II illustrates the calculated amount of free piperidine based on the theoretical equivalent weights of the compound used.

It should be noted that in making the calculations listed in Table II, it was assumed that all of the piperidine reacted with the Epon 828 before the ethylmethylimidazole was added. Although this is not 100 percent accurate in all instances, it is very nearly correct on the basis of the relative basicity of the two amines. Thus, piperidine has a PKa value of 11.123 at 25° C.; whereas ethylmethylimidazole has a PKa value of about 8.3 by analogy to 2,4-dimethylimidazole which has a PKa value of 8.359. Piperidine is thus by far a stronger base and more reactive.

Examination of Table II also shows that the prepolymer curing agent will exhibit a piperidine vapor pressure of only 15% of piperidine's normal vapor pressure. In utilizing a prepolymer such as produced in sample 3, 10 parts by weight (pbw) of the prepolymer is formulated with 95.6 pbw of Epon 828 to give what is equivalent 10 pbw PIM/100 pbw Epon 828. Similarly, 5 pbw of prepolymer 3 would then be blended with 97.8 pbw

TABLE I

COMPOSITIONS

| Sample No. | Piperidine | | | Ethylmethyl-imidazole | | | Epon 828 | | |
|---|---|---|---|---|---|---|---|---|---|
| | PBW | Wt. % | Mole % | PBW | Wt. % | Mole % | PBW | Wt. % | Mole % |
| 1 | 4 | 20.4 | 37.1 | 6 | 30.6 | 43.0 | 9.6 | 49.0 | 20.0 |
| 2 | 4 | 22.6 | 38.6 | 6 | 33.9 | 44.7 | 7.6 | 43.5 | 16.7 |
| 3 | 4 | 24.4 | 39.7 | 6 | 36.6 | 46.0 | 6.4 | 39.0 | 14.3 |

TABLE II

PREPOLYMER PROPERTIES

| Sample No. | Remaining Piperidine In Prepolymer After Reaction | Mole Fraction of Piperidine In Finished Prepolymer | % of Normal Piperidine Vapor Pressure |
|---|---|---|---|
| 1 | 0% | 0 | 0 |
| 2 | 13.4% | 0.077 | 7.7 |
| 3 | 28.0% | 0.156 | 15.6 |

In the tables above, all the prepolymer curing agents were prepared by initially mixing and reacting piperidine and Epon 828 together. The temperature of the mixture is regulated to be below 40° C. and preferably below 30° C. In this manner the reaction exotherm is controlled, which in turn helps prevent piperidine from being vaporized. Proportions are selected such that substantially all of the piperidine is consumed in formation of the epoxy prepolymer adduct. EMI is added after the reaction subsides and the epoxy resin prepolymer curing agent solution results. When the EMI is added, no additional exotherm is produced, as all of the Epon 828 has already been consumed. Consequently, runaway polymerization and cure are avoided. The final product may contain free (unreacted) piperidine, but since it accounts for only a small fraction of the total weight of the prepolymer curing agent, the vapor pressure of the agent is such that essentially no piperidine vapor will be released. Additional Epon 828 can be added to further reduce the amount of residual piperidine. Depending on the amount of Epon 828 used, a relatively free-pouring to relatively viscous curing agent is produced.

Epon 828 to give what currently is equivalent 5 pbw PIM/100 pbw Epon 828.

The use of Epon 828 as the epoxy resin for practicing the method of the present invention is intended to be exemplary in nature, and other known epoxy resins may also be used, alone or in combination.

Having fully described the invention and disclosed a recipe for its utilization which teaches those skilled in the art how to make and use the invention without undue experimentation, the nature and scope of the claims will now be set forth. It should be understood, therefore, that this invention is not to be limited to the particular embodiments herein disclosed and that the principles involved are susceptible to other applications which will be apparent to those skilled in the art.

What is claimed is:

1. A method of making an epoxy prepolymer curing agent composition comprising the steps of:
   (a) reacting a mixture of piperidine and an epoxy resin so as to form an epoxy prepolymer; and
   (b) adding 2-ethyl-4-methylimidazole to said epoxy prepolymer thereby forming said curing agent composition.

2. The method according to claim 1 wherein step (a) is carried out at a temperature below 40° C.

3. The method according to claim 1 wherein said epoxy resin is a polymerizable glycidyl ether epoxy.

4. The method according to claim 1 wherein said epoxy resin is a diglycidyl ether of Bisphenol A having an epoxy equivalent weight of about 180–195.

5. The method according to claim 1 wherein said prepolymer produced in step (a) has the following formula:

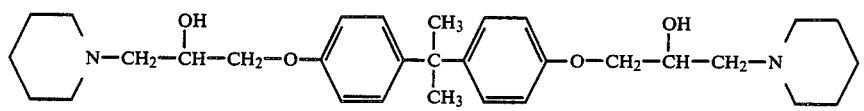

6. The method according to claim 1 wherein said piperidine and 2-ethyl-4-methylimidazole, respectively, are used in a weight ratio of 4:6.

7. An epoxy prepolymer curing agent composition produced according to the method of claims 1 or 2.

8. A method of making an epoxy prepolymer curing agent composition comprising the steps of:
   (a) reacting a mixture of piperidine and a polymerizable glycidyl ether epoxy resin at a temperature below about 40° C. so as to form an epoxy prepolymer; and
   (b) adding an alkyl substituted imidazole to said epoxy prepolymer thereby forming said curing agent composition.

9. A method according to claim 8 wherein said epoxy resin is a diglycidyl ether of Bisphenol A having an epoxide equivalent weight of about 180–195.

10. A method according to claim 9 wherein said imidazole is 2-ethyl-4-methylimidazole and the weight ratio of piperidine to imidazole is 4:6.

11. An epoxy prepolymer curing agent composition produced according to the method of claim 10.

* * * * *